(12) United States Patent
Lublinsky et al.

(10) Patent No.: US 11,536,576 B2
(45) Date of Patent: Dec. 27, 2022

(54) MAP DATA COMPATIBILITY PROCESSING ARCHITECTURE

(71) Applicant: HERE Global B.V., Eindhoven (NL)

(72) Inventors: Boris Lublinsky, Chicago, IL (US); Stefano Pettini, Berlin (DE); Alex Kozlowski, San Marcos, CA (US); Pedro Larroy, Berlin (DE)

(73) Assignee: HERE Global B.V., Eindhoven (NL)

( * ) Notice: Subject to any disclaimer, the term of this patent is extended or adjusted under 35 U.S.C. 154(b) by 323 days.

(21) Appl. No.: 15/440,290

(22) Filed: Feb. 23, 2017

(65) Prior Publication Data

US 2018/0239828 A1    Aug. 23, 2018

(51) Int. Cl.
G06F 16/29    (2019.01)
G01C 21/32    (2006.01)
G01C 21/34    (2006.01)

(52) U.S. Cl.
CPC ............ *G01C 21/34* (2013.01); *G01C 21/32* (2013.01); *G06F 16/29* (2019.01)

(58) Field of Classification Search
USPC ........................................................ 707/754
See application file for complete search history.

(56) References Cited

U.S. PATENT DOCUMENTS

| | | | |
|---|---|---|---|
| 6,154,152 A | 11/2000 | Ito | |
| 8,718,927 B2* | 5/2014 | Kitchel | G01C 21/32 |
| | | | 701/412 |
| 8,762,555 B1* | 6/2014 | Peterson | G06F 16/29 |
| | | | 709/229 |
| 8,775,074 B2* | 7/2014 | Samsalovic | G01C 21/32 |
| | | | 340/995.11 |
| 8,938,464 B2* | 1/2015 | Bailly | G06F 16/29 |
| | | | 707/758 |
| 9,092,502 B1 | 7/2015 | Cannaliato et al. | |
| 10,444,940 B2* | 10/2019 | Cervelli | G06F 16/29 |
| 2002/0107876 A1* | 8/2002 | Tsuchida | G06F 11/2094 |
| 2006/0190172 A1* | 8/2006 | Cross | G01C 21/20 |
| | | | 701/469 |
| 2009/0171558 A1* | 7/2009 | Davis | G01C 21/26 |
| | | | 701/532 |
| 2012/0203747 A1 | 8/2012 | Douetteau et al. | |
| 2013/0322702 A1 | 12/2013 | Piemonte | |
| 2013/0332057 A1* | 12/2013 | Moore | G08G 1/0962 |
| | | | 701/118 |

(Continued)

OTHER PUBLICATIONS

Authmann, Christian, et al. "Rethinking Spatial Processing in Data-Intensive Science." BTW Workshops. 2015.

(Continued)

*Primary Examiner* — Tamara T Kyle
*Assistant Examiner* — Raheem Hoffler
(74) *Attorney, Agent, or Firm* — Lempia Summerfield Katz LLC

(57) ABSTRACT

Systems and methods are provided for executing a filter on map data. The filter receives a first notification that a version of first map data from a first map data source is available. The filter determines that the version of first map data is compatible using one or more version rules stored in the filter. The filter processes the version of first map data, when the version of first map data is compatible. The filter generates a second notification that a processed version of first map data is available.

16 Claims, 11 Drawing Sheets

(56) References Cited

U.S. PATENT DOCUMENTS

2016/0125000 A1    5/2016  Meacham et al.
2016/0275131 A1    9/2016  Lublinsky et al.
2017/0052654 A1*   2/2017  Cervelli ............... G06T 19/006

OTHER PUBLICATIONS

Purbrick, Jim, and Chris Greenhalgh. "An extensible event-based infrastructure for networked virtual worlds." Presence: Teleoperators and Virtual Environments 12.1 (2003): 68-84.
Y. Ramu, et al. "International Journal of Advanced Research in Computer Science and Software Engineering—A Relative Study on Traditional ETL and ETL with Apache Hadoop" International Journal 6.3. Mar. 2016.
OpenStreetMap.org: "Batch Upload of GPX (various tools)", Feb. 20, 2017 (Feb. 20, 2017), XP002780855, Retrieved from the Internet: URL:https://wiki.openstreetmap.org/wiki/Batch Upload of GPX (various tools) [retrieved-on—May 8, 201g]—the whole document.
PCT International Search Report and Written Opinion of the International Searching Authority dated Jun. 6, 2018 for corresponding PCT/US2018/016968.
"Method for adding landmarks to road map, involves compiling landmark information received for each road on basis of road associated with landmark and landmark on roadmap is linked with road segment of road" Database WPI. Week 201643. Thomson Scientific, London, GB; AN 2016-33318X—XP002801146, 2016.
European Office Action for European Patent Application No. 18 707 179.0-1001 dated Nov. 27, 2020.

* cited by examiner

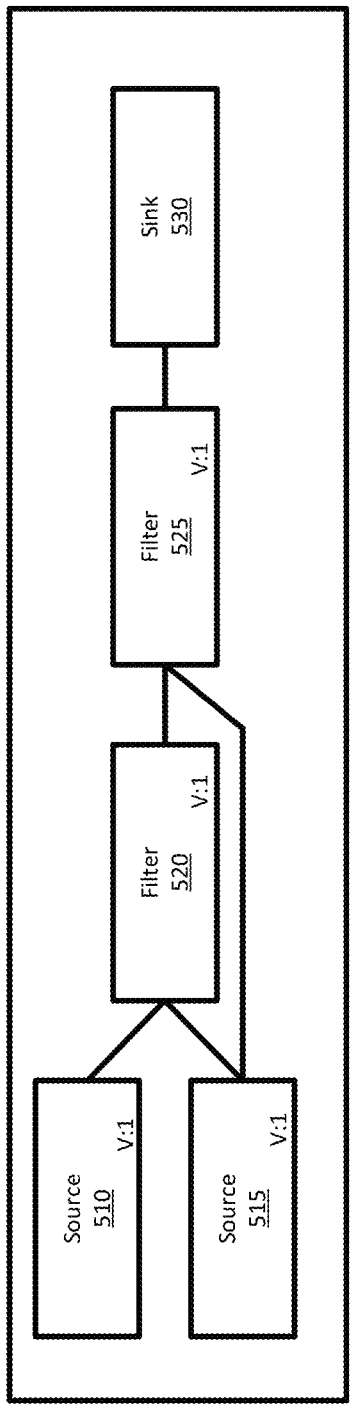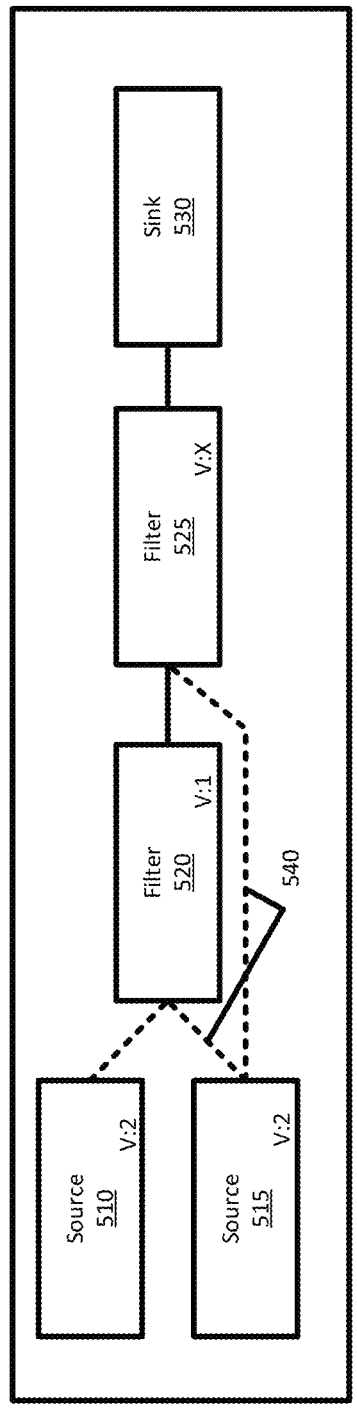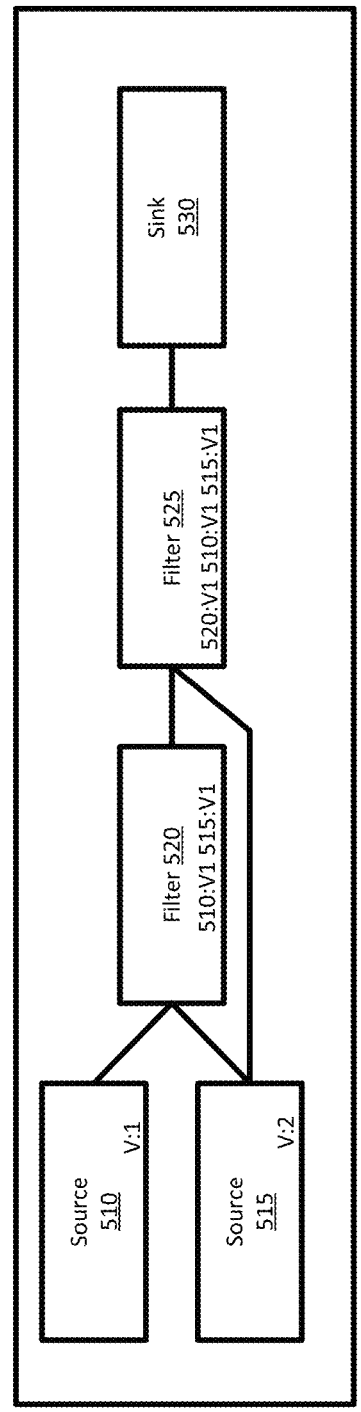

MAP DATA COMPATIBILITY PROCESSING ARCHITECTURE

FIELD

The following disclosure relates to mapping systems and map related applications, and more specifically to updating map data.

BACKGROUND

Navigation services are used to provide routing and mapping services to end users and applications. Applications, for example, may access map data to generate an efficient path from a starting point to a destination. Up to date data is useful for the application to generate an efficient route, for example, avoiding accidents and construction. In the field of autonomous vehicles, up to date map data is important for a navigation system to safely travel the roadway. As new roads are built, other roads are closed, locations of business are changed, or other changes occur to the roadway network, the geographic data required to support the navigation services changes.

In order to keep the map data up to date, navigation systems collect data from multiple sources, process the data into a master database, and provide copied or pieces of the database to end users or applications. The steps of organizing and compiling the constant stream of incoming map data may be unwieldy. Changes or additions to data sources or organizational methods are difficult to make or test and may result in temporal gaps in the updates to the outputted map data.

SUMMARY

In an embodiment, a method is provided for for executing a filter on map data. The method includes receiving, by the filter, a first notification that a version of first map data from a first map data source is available. The filter determines that the version of first map data is compatible using one or more version rules stored in the filter. The filter processes the version of first map data, when the version of first map data is compatible. The filter generates a second notification that a processed version of first map data is available.

In an embodiment, a system is provided for processing map data. The system includes a processing module, a data store, a messaging module, and a version management modules. The processing module is configured to process one or more versions of map data. The data store is configured to store the one or more versions of map data and meta data related to the one or more versions of map data. The messaging module is configured to receive and transmit one or more notifications relating to the one or more versions of map data stored in the data store. The version management module is configured to store one or more rules that define a plurality of compatible versions of map data for the processing module.

In an embodiment, a method is provided for executing filters on map data. The method includes receiving, by a filter, a first notification that a first version of first map data from a first source is available. The filter determines that the first version of first map data as compatible with the filter. The filter receives a second notification that a second version of second map data from a second source is available, the second map data including different map data features than the first map data. The filter determines that the second version of second map data as incompatible with the first version of map data. The filter receives a third notification that a third version of second map data from the second source is available, the third version newer than the second version. The filter determines that the third version of second map data is compatible with the first version of map data. The filter receives the first version of first map data and the third version of second map. The filter generates a fourth version of third map data using the first version and third version.

BRIEF DESCRIPTION OF THE DRAWINGS

Exemplary embodiments of the present invention are described herein with reference to the following drawings.

FIGS. 5A, 5B, and 5C illustrate an example of versioning compatibility.

DETAILED DESCRIPTION

Embodiments are provided that generate and serve map content to applications. Sources of map data collect and provide different types of map data. Filters, e.g. processing units or controllers, operate on the map data from the sources to generate a deliverable product for end users or applications. Each filter includes a version management module that defines the versions of source map data that are compatible with the respective filter. In this way, each filter may be individually designed, implemented and tested without affecting the operation of the entire system. Filters may additionally be easily added or removed from the system.

Figure 1:
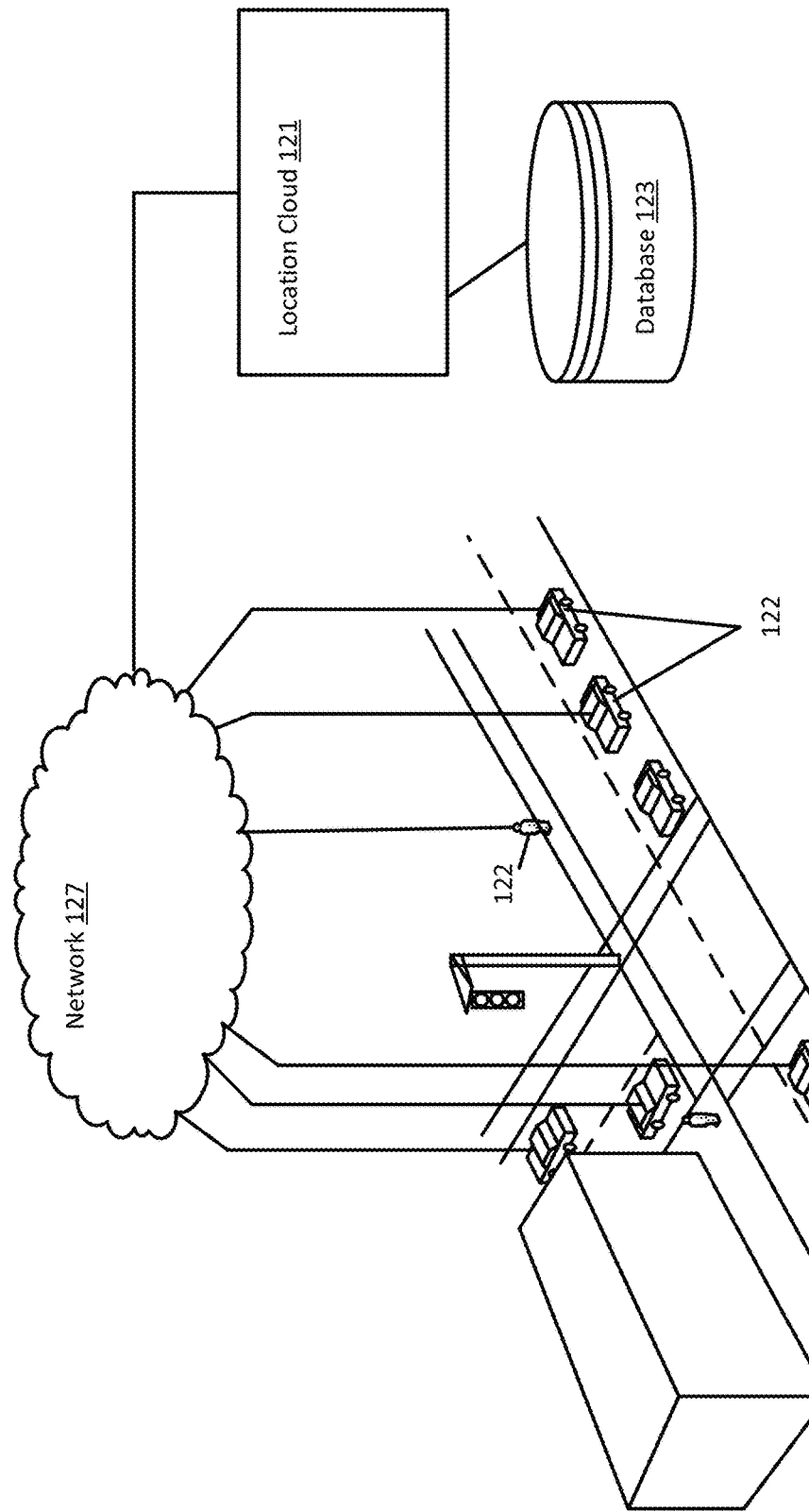
FIG. 1 illustrates an example system for providing map data.

FIG. 1 illustrates an example mapping system. The system includes one or more devices 122, a network 127, and a location cloud 121. The device(s) 122 are coupled with or wirelessly connected to the network 127 that is coupled with or wirelessly connected to the location cloud 121. Herein, the phrase "coupled with" is defined to mean directly connected to or indirectly connected through one or more intermediate components. Such intermediate components may include both hardware and software based components. Additional, different, or fewer components may be included.

FIG. 1 includes one or more devices 122 from which data is collected about the roadway network. The data is transmitted over the network 127 to a location cloud 121. The location cloud 121 processes and stores the collected data into map data that is stored in one or more databases 123. The map data is made available for delivery for use by end users, businesses, or applications. A device 122 may request map data, for example, for use in generating a route from a starting point to a destination.

The device(s) 122 and/or other sensor(s) may be configured for collecting data. The data may be transmitted over the network. The device(s) 122 may also be configured to receive data through the network. The received data may include routing or navigation data, video data, audio data, or data relating to the device 122 or vehicle.

The location cloud 121 may include one or more servers, workstations, databases, and other machines connected together and maintained by a manager of connected vehicle data, including but not limited to map, sensor, wireless network, temporal climate and incident data. The term location cloud 121 is used herein to collectively include the ingestion, analytic/computational, application program interfaces (API's) and message distribution capabilities residing in both local and cloud based systems including the systems used for creating, maintaining, accessing, and updating one or more geographic database(s) 123.

The network 127 may include wired networks, wireless networks, or combinations thereof. The wireless network may be a cellular telephone network, LTE (Long-Term Evolution), 4G LTE, a wireless local area network, such as an 802.11, 802.16, 802.20, WiMax (Worldwide Interoperability for Microwave Access) network, or wireless short range network such as Dedicated Short Range Communications (DSRC/802.11P). Further, the network 127 may be a public network, such as the Internet, a private network, such as an intranet, or combinations thereof, and may utilize a variety of networking protocols now available or later developed including, but not limited to TCP/IP based networking protocols. The network 127 may be configured for transmitting data between the devices 122, the location cloud 121, and/or other equipment or devices in the system.

Figure 2:
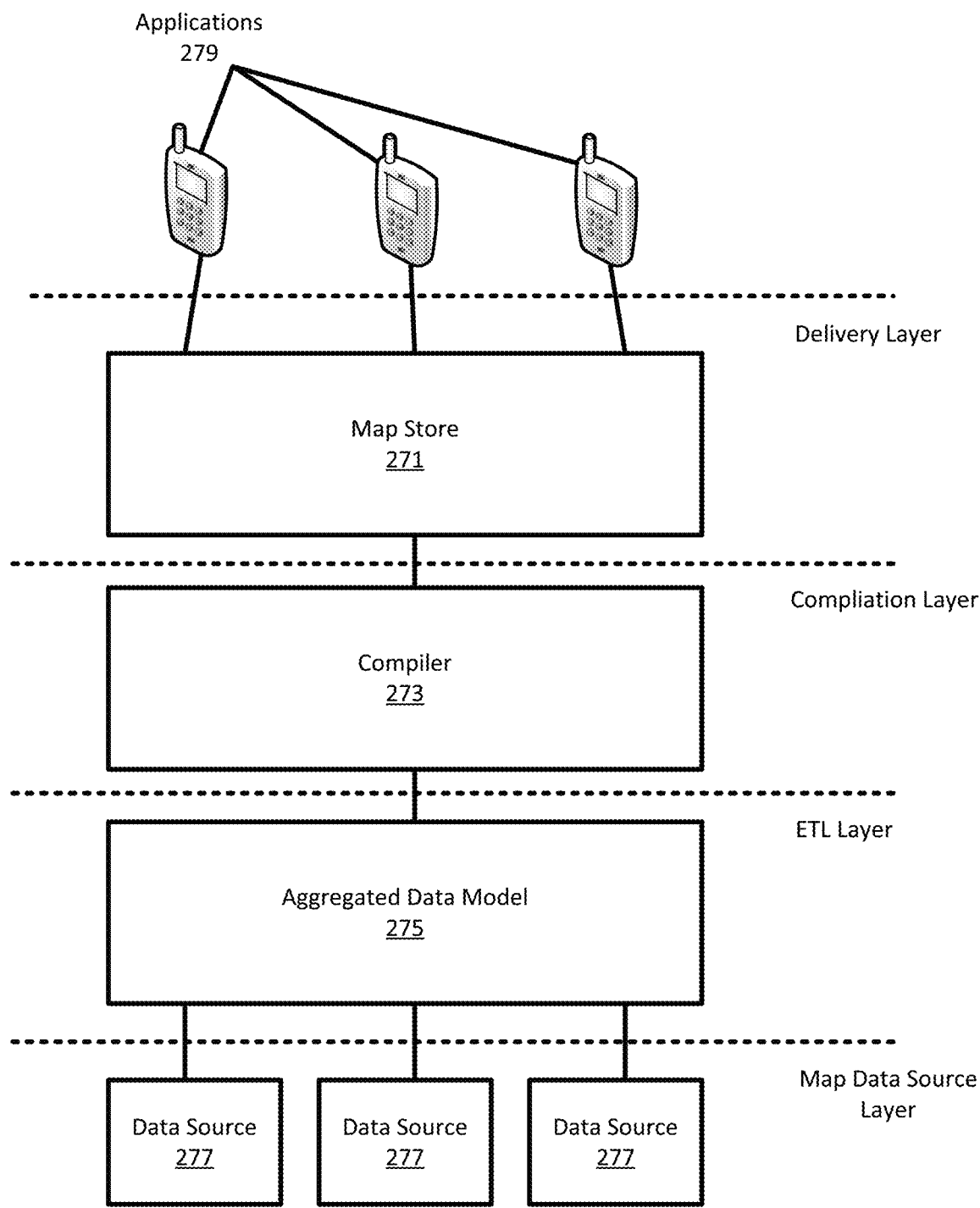
FIG. 2 illustrates an example layer chart for providing a single data model.

FIG. 2 illustrates an example flowchart for such a single model. A process of generating map data begins with data that is collected from data sources 277. The data sources may include data from one or more devices 122. The data from the sources is aggregated 275 into a data model that consolidates the source data into a single model. The single model is then complied 273 into databases 271 that may be used by end user applications 279. A drawback of the single model is that the single model is difficult to update or change. There are four layers in FIG. 2, the map data sources layer, the ETL (extract, transform, load) layer, the compilation layer, and the delivery layer. Each of the four layers receives (or generates) data, processing the data, and then passes the result to the next layer.

At the data source layer, data is retrieved from a given source 277 as a full extract. Map data may be received from devices 122 operating on a roadway. Map data may be received from businesses or governmental agencies. The data sources 277 may be one or more separate databases, for example, a database of construction site, a database of weather, a database of special events, among others. Each database may collect, store, and update different map sources. For example, a database may store and maintain an updated database of the roadway network, e.g. the existing physical roadways. As changes occur, the source database(s) may be updated. The databases may provide extracts to the system for processing.

The ETL layer may be configured to read extracts and data from the sources, consolidate the data, and rationalize the data against each other source to build 275 a unified data model. ETL is short for extract, transform, load, three database functions that are combined into one tool to pull data out of one database and place it into another database. Extracting is the process of reading data from a database. Transforming is the process of converting the extracted data from a previous form into the form the extracted data should be in so that the data may be placed into another database. Transformation occurs by using rules or lookup tables or by combining the data with other data. Loading is the process of writing the data into the target database. The ETL layer is used to migrate data from one database to another, to form data stores and data warehouses and also to convert databases from one format or type to another. The output of the ETL layer is a unified data model.

The compilation layer takes objects from the unified data model and compiles 273 the objects to the map store that can be used by the delivery layer for delivery to end users. The delivery layer provides interfaces, e.g. API's such as through map stores 271 for end users or applications 279 to access the map data.

The single unified model currently works well as a rigid system that may be used to deliver map data to end users. The single unified model, however, has several drawbacks. Adding additional data source requires significant work in the ETL layer for reading and rationalizing this data. Adding additional data sources also requires modification of the unified model to accommodate this additional information. The single unified model further does not provide any public APIs and is hard-wired to the compilation layer. Being hardwired makes it difficult to reuse the single unified model for building or designed additional compilers. Additionally, as the single unified model system works only on the full extracts, the single unified model creates physical limitations on the frequency of the map data updates. Updates of the underlying data source are frozen for the duration of the extract to ensure the extract's consistency. During this time interval, no data can be published to the source.

One step in overcoming the issues with single unified model may be by splitting the layers into separate components. For example, the layers in FIG. 2 may be broken into different pieces. For example, the ETL layer and the compilation layer may include different components that are individually programmed to accept specific data and output map data. This is an alternative to a single unified model. One architecture that may be used is a system of pipes and filters. In a classical pipes and filters system, a pipe represents a message queue. A message may be any set of data. A filter is a process, thread, or other component that reads messages from an input pipe, one at a time, processes each message, then writes the result to an output pipe. The term filter herein may refer to a component that operates, e.g. alters or changes, on map data received from an input. The output of a filter includes processed or operated-on map data. Filters may take on multiple roles and may be referred to as data elements. The term data element, for example, may include multiple types of filters including but not limited to data sources and data sinks. Data sources and data sinks are specialized types of filters. The terms filter, data sources, and data sinks will herein be used to refer to data elements.

Two methods for operating a pipe and filter system include demand driven or message based. In a demand driven approach, the filters request data when ready. In a message drive approach, the filters transmit a notification when data is ready to be passed on. Filters wait and listen for a notification message for data that is relevant to that respective filter. When a notification is received the filter requests and retrieves the data that the filter is waiting for. In certain embodiments, a message based execution is used. Each filter uses its own execution policy based on the notifications from other filters/sources. A demand driven approach may be used, but may be more complex. A demand driven approach may uses a centralized server that contains complete knowledge about the system. Implementation may be complex and require updates to the entire system every time a new component is added. The complexity is due to the requirement that an entire graph (topography) of the system must be traversed for dependency in order to find initial filters that have to be executed to initiate required updates. The complexity limits a demand driven approach to local, smaller executions.

Figure 3:
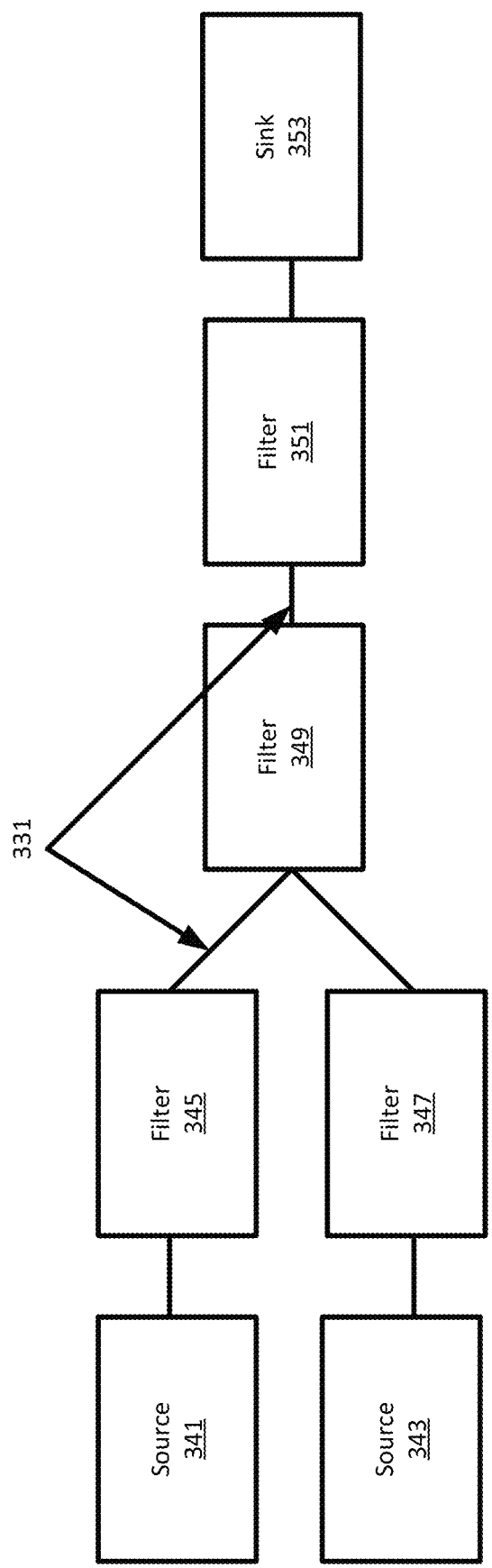
FIG. 3 illustrates an example of the proposed architecture for serving map data.

FIG. 3 illustrates an example of the proposed architecture for serving map data to applications using pipes and data elements and a message driven approach. FIG. 3 depicts a processing graph made up of pipes and data elements. The processing graph contains seven data elements 341-353, four of which are filters (345, 347, 349, 351), two of which are data sources (341, 343) and one of which is a data sink (353). The connections or lines 331 between the data elements are the pipes or edges of the graph. The pipes or edges 331 of the graph represent both data flow and dependencies. The data sources 341, 343 represent a data source entity, e.g. an entity in the system that can change its state by itself. While a data source may receive external data, the data source may also change without input from another filter. The filters 345, 347, 349, 351 represent processing entities containing both atomic processing of the source data and versioned map data. The sink 353 represent a special filter that is used for APIs. APIs here represent interfaces for applications or enterprise to use the assets (map data) of the location cloud. APIs may be internal or public. Each filter or sink may include an API to allow easier access to the data elements generated and/or stored within the filter or sink.

The edges 331 of the graph carry version vectors which contain a list of intermediate sources and filters and the versions. This information is stored in the source/filter metadata in the filters and is accessible via both notifications and metadata APIs. The edges 331 are not hardwired, rather each filter may be configured to communicate with the other filters. The edges 331 in FIG. 3 visualize potential data paths.

A map data processing graph, e.g. edges 331 and data elements (filters, sinks, and sources) may follow a set of rules. The rules dictate the behavior of the components and what is permitted or not permitted in the system. Rules may include what type of filters or sinks are available. Rules may include what type of access, for example, public or private, is permitted. The interconnection and communication between filters may be defined by the rules. The type of meta data, e.g. data that describes the filters and or map data, may be defined by the rules.

One set of rules described below allows for implementation of new filters and sources. The rules permit injection of the new filters into the system without disturbing existing filters. Filters may further be tested or altered without stopping the system, allowing map data to be able to flow from sources to end users or applications without pause. In this example system, every sink may be exposed as an API. Each sink may allow access to public or private users to access both the map data and or any meta data related to the filters or map data. For example, a sink exposed as an API for the public to access meta data may allow an application to check when a new version of map data is available. The sink may further allow an application to check to see what the changes from one version to another are, e.g. what data has been updated. An application may use this information to make a decision on whether to download the map data or wait for another version. The application may further use the meta data to verify compatibility with the map data prior to downloading and accessing the map data. The rules in the system may allow a new sink cab to be created at any point in the system. A sink, for example, may exist for an end product, but also at any point along a chain of filters. If, for example, there is a chain of multiple filters, a sink may be created for one or more of the filters allowing access to both the meta data (e.g. tracking changes) and the map data. In this way, an application may have access to pre-filtered map data at each point in the chain. An application, for example, that performs the task of a filter (externally as opposed to internally to the location cloud), may access the pre-filtered data. If, for example, there are six filters in the chain, an application would be able to access the data after, for example, three filters have operated on the map data, but before the final three filters.

Each filter may generate a new version of map data not only based on the changes of its dependent sources but also based on external events. Filters may access data that is outside the system. External data may or may not be related to map data. Filters may also receive manual input from one or more users.

For each new version creation by a filter or source a notification is published by the filter or source. The notifications may be subscribed to by any filters or applications. The notification may include the full version dependency chain. A full version dependency chain may include each version that is valid for all dependents in the chain of filters. The notification may include information (meta data) relating to the version, e.g. any changes from the previous versions. The notification may include additional meta data relating to the version or filter.

Each source and or filter may provide two sets of APIs—data and metadata. Data APIs provide access to data, based on version and any additional, filter specific information. Metadata APIS provide query APIs, that supports additional metadata queries, including current version, specific change information between versions, and other informational queries. Each filter may operate concurrently e.g. not as database transaction.

In this way, new versions of filter's data may be published while processing occurs as opposed to waiting until the database transaction is completed.

Figure 4:
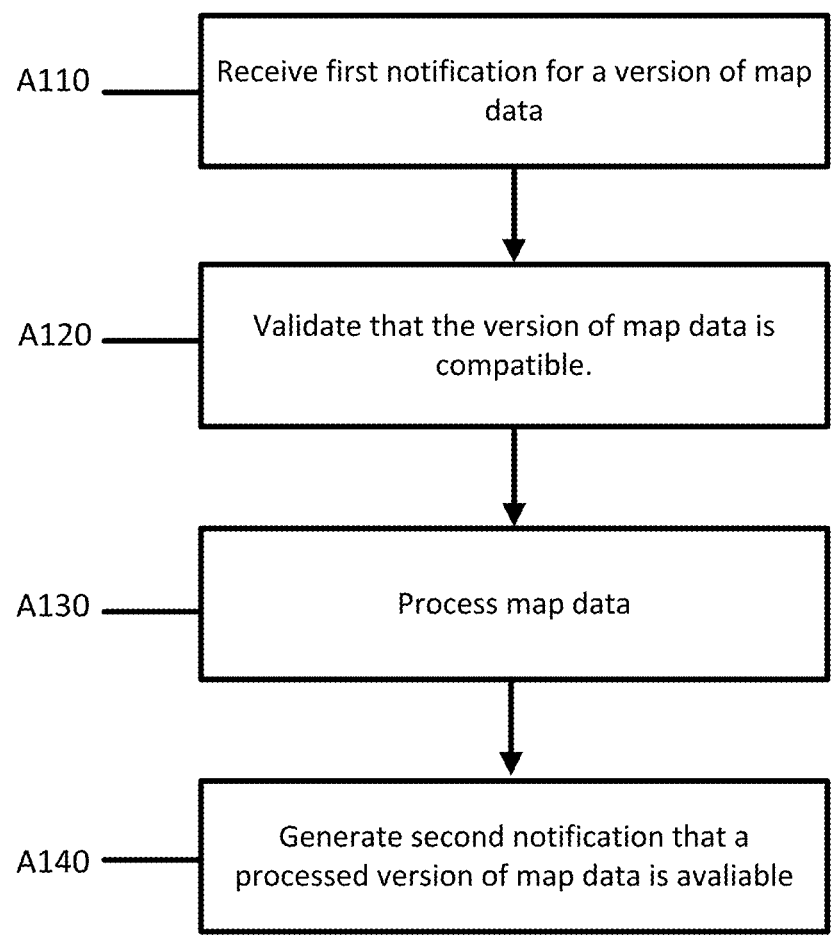
FIG. 4 illustrates an example workflow of a filter of the architecture of FIG. 3.

FIG. 4 illustrates an example workflow of a filter of the architecture of FIG. 3. As presented in the following sections, the acts may be performed using any combination of the components indicated in FIG. 1, 5, or 7. Additional, different, or fewer acts may be provided. The acts are performed in the order shown or other orders. The acts may also be repeated.

The disclosed embodiments may be implemented to computationally optimize managing up to date mapping data and consequently improving and optimizing navigation services. The disclosed embodiments lead to an improvement in the computational system, e.g. in the way the map data is processed and compatibility is handled. The increased efficiency and usage of resources may lead to less downtime, quicker implementation time, fewer errors, and as such, more efficient use of the roadway network.

At step A110, the filter receives a first notification that a version of map data from a map data source is available. Map data may be generated by any filter. In the architecture, there are specialized filters that are data source filters that are configured to generate map data without input from another filter. FIG. 3 illustrates two data sources filters 341 and 343. Data source filters (referred to as sources or data sources) may include one or more sources of map data or data related to a roadway network.

In addition to data sources providing map data, other filters in the chain may generate map data. For example, a filter may operate on map data from a source and then output a different set of data. A filter may operate on map data from another filter and then output a different set of data. These filters are depicted in FIGS. 3 as 245, 247, 349, and 351.

When new data is generated, a notification is published by a source or filter. The notification may be transmitted to other filters or applications that subscribe to the filter. A filter may subscribe to a filter by identifying that filter as a dependent filter. The filter may transmit a message that requests the filter transmit notifications message to the subscribing filter. In certain embodiments, the notification is published to the entire system. For example, the system may include a message board or table of generated data versions that may be used by filters to lookup and see if the correct version of data is available. A newly implemented filter may be inserted into the system without having to adjust the topography of the entire network. The system topography does not have to be rewritten. The newly implemented filter may be easily inserted as the newly implemented filter may check for notifications or publish notification without having explicitly hardwired connections to other filters or sources.

At step A120, the filter checks for compatibility the version of map data against a version rules table stored in the filter. Data sources and filters may generate multiple versions of map data. For example, a data source may receive data from the one or more devices, aggregate the data, and publish or output a versioned set of map data every minute, hour, day, week, etc. A data source may update its data each time it receives something new or it may update based on a schedule. Each version of map data may be slightly different than the previous version. In order for the filters to process the map data correctly, the filters must identify the correct version of map data to be input. If, for example, a filter receives map data from two sources, that map data must be compatible with one another (and the filter). For example, a filter may receive data from two sources, a roadway database that tracks changes to the roadway network (e.g. which roads exist where), and a point of interest (POI) database that contains information for one or more POIs. The output of the filter is map data that associates POI data with the roadway network. The filter may require inputting the correct versions of both sets of map data in order to output accurate map data. If, for example, the roadway network data is the wrong version, the POI data may not match up, leading to the filter producing erroneous map data (that may subsequently be used by other filters or an API).

Each of the plurality of filters may maintain a list of versions or range of version that are compatible with the respective filter and or other versions of map data. The versions or version ID of a given data element may be stored as an integer value. Alternatively, the versions may be incremented using alternative numbering schemes such as using a decimal or alphabet based scheme. In certain embodiments, Version IDs may be incremented. Decrementing may be prohibited. The ID space for version IDs may be global across all data elements in the system. For example, in a specific system, a version ID of 23 may always be deemed older than, for example, a version ID of 45. The Version IDs may be managed by a server for the entire system. The server may increment version IDs temporally or based on other inputs. For example, the version IDs may track the time of day, day, month, year etc. In another example, Alternatively, the version IDs may track a data source. In this example, the version ID may be directly related to a version of a data source that is used as the underlying data for the system. Users or application may not be allowed to change or increment data element's version IDs. Users or applications may manage version IDs local to the users or applications.

When map data is generated, the map data receives a new version ID. The version ID for the version may be based on a last global version ID for the system. The global system wide version ID may be defined by the latest assigned version ID by the server. The version ID may be assigned to each one of simultaneously committed data elements. Multiple data elements can have the same version ID. Items may have the same version ID if the items were either created or changed during the same transactional process (i.e. are created altogether at the same time). Additionally, if multiple filters generate (or start to generate) map data within a specific time period, the version IDs for the generated map data from each filter may be similar or the same depending on the version ID scheme used by the system. Existing unchanged items do not receive changes in their version ID.

The version IDs for each data element in the entire system may be provided to users and applications through one or more APIs. The global version ID may be published as the global version ID changes. When a user retrieves data elements from the server, the user may also receive the version for each data element from the server as well as the overall highest Version ID for the entire system. In this way, a user or application may be able to check to see if the user or application has the most recent map data from the system. Individual APIs included with individual filters or sources may also publish the latest version ID.

Using a version ID allows for compatibility management of the map data as the map data passes from data element to data element (e.g. source to filter(s) to sinks). Neighboring data elements that have the same version ID have been created within the same transaction and hence are fully compatible. Data elements that have different version IDs may still be compatible depending on the scenario. Data elements may be compatible with a range of version IDs, depending on the level of changes. Data elements may use locally stored versioning rules to check compatibility with versions of map data.

A sample set of compatibility rules for data element versions may be used to illustrate compatibility between different elements. In this example, version X of the data element A is compatible with version Y of data element B (if X>Y) if and only if there is no versions of A between X and Y. Using such a sample schema, cross component version management may be resolved. Alternative rules may be used for versioning including using ranges of versions that are compatible.

FIGS. 5A, 5B, and 5C illustrate versioning compatibility. Each of the FIGS. 5A-5C include two data sources 510 and 515, two filters 520 and 525, and a sink 530. The filter 520 receives map data from the two data sources 510 and 515 and generates filter 520 map data. The filter 525 receives map data from data source 515 and filter 520 and generated filter 525 map data. The sink 530 receives filter 525 map data and makes the map data available to end users and applications. In FIG. 5A, the sources provide V:1 of outputted map data which is then propagated to the filters and then to the sink. V:1 may represent map data that is provided at a first time. V:2, V:3, V:4, etc. represent map data that is provided at subsequent times.

FIG. 5B illustrates the same data elements, however, in this example, filter 520 is slower than filter 525. Filter 520 may involve more complex processing or may process more data for example. As a result, filter 520 takes longer to generate an outputted element V:1 than filter 525 takes to generate a new version. In the example, when data sources 510, 515 change and provides updated map data V:2 (indicated by the dotted lines 540), issues may arise. Both filters 520 and 525 are connected to the data source 515, so if it changes, theoretically both filters 520 and 525 will process and update their respective map data. However, if filter 520 is still working on V:1 or has not completed V:2, then filter 525 will receive data from source 515 and the filters will out of alignment. Filter 525 may generate a new version of data using V:X from filter 520 and V:2 from 515. Because the versions are different, the output, e.g. V:X from Filter 525 may include errors or inconsistent results as it a cross between V:1 or V:2.

The issue of versioning is corrected in FIG. 5C. Each filter provides the full version of the map data. E.g., the edge carries the full version vector containing the data version of every source/filter. For Filter 520, the output version is 510:V1, 515:V1 (version 1 from the sources, 510 and 520). For Filter 525, the output version is 520:V1, 510:V1, 515: V1. The versions that are compatible with each filter may be stored at the filter. In the example of FIG. 5C, filter 525 may include a rule only to use version of data that are exactly alike. As such, filter 525 would not operate with V:2 from source 515 and V:1 from filter 520, but rather would wait until all sources are V:2. Such a rule would also prohibit filter 525 from using map data 510:V1, 515:V2 from filter 520 as the versions are different. The version data that is published by the Filter may allow other filters and sinks to determine compatibility. One set of rules for a filter may include the following acts: identify dependency list for every source that should be used by the filter, identify the list of overlapping filters/sources, and the version are the same, the sources are compatible.

Referering back to FIG. 4, at act A130, the filter processes the version of map data when the version of map data is validated. Operation by the filter may involve one or more acts that alter or combine the input map data with additional data or processing to generate processed map data. Filters may be as simple as adding a color or indication to map data, or as complex as deriving and implementing a traffic model. Filters may access external data to use in the processing.

At act A140, the filter generates a second notification that a filtered version of map data is available. In certain embodiments, each new version of map data that is generated is accompanied by a notification message. The notification message may alert the system that a new version of data is available and include meta data that describes the new version. Other filters, sinks, or users may be listening for notification message that relate to map data that is relevant to the respective filter. For example, a filter A that uses map data from filter B may listen for any notification messages from filter B indicating that a new version of outputted data from filter B is available. Once the notification from filter B is received or identified, filter A may request the data from filter B and begin its own processing. Additionally, if filter A uses data from both filter B and C, filter A may listen for a notification message from both filters before requesting data. In both scenarios, filter A checks the meta data that describes the map data from filter B and C to make sure that the map data is both the right data and acceptable version.

Figure 6:
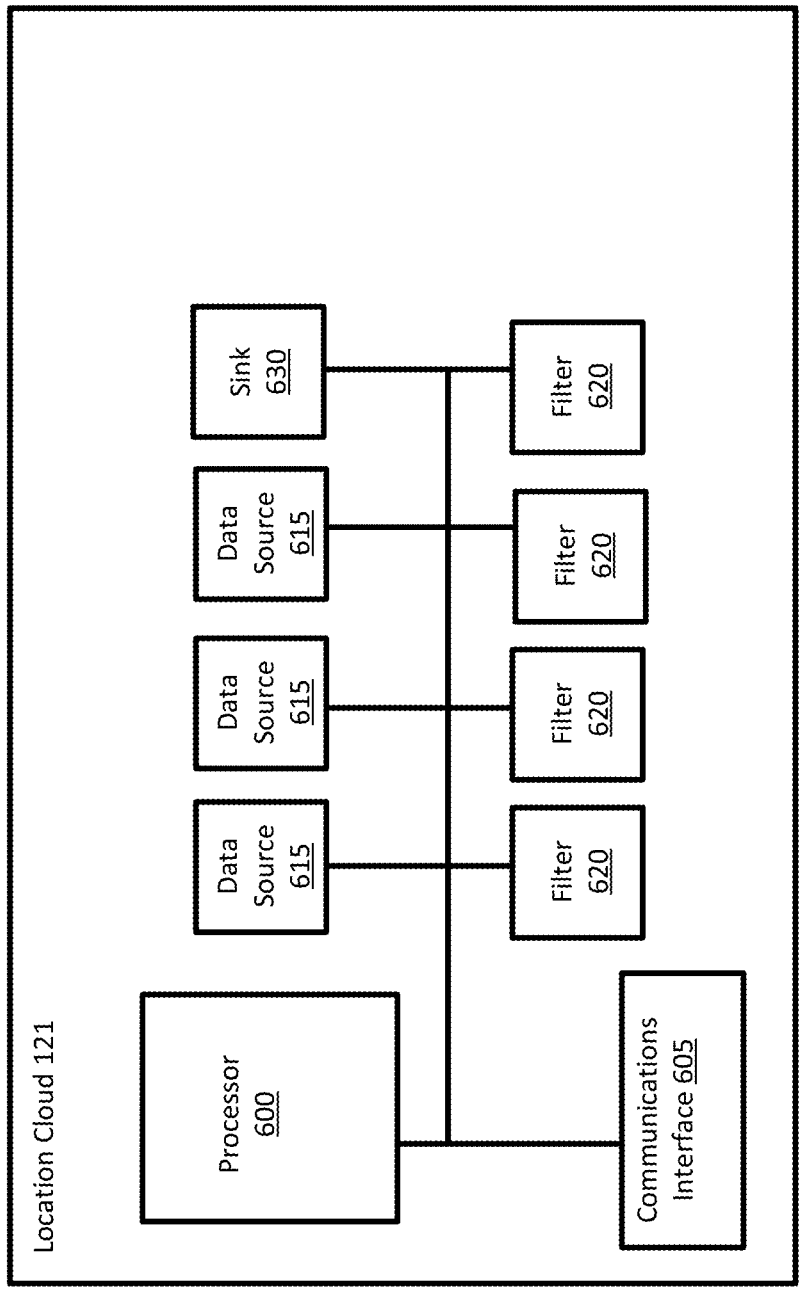
FIG. 6 illustrates an example location cloud of the system of FIG. 1.

FIG. 6 illustrates an example location cloud of the system of FIG. 1. The location cloud 121 may include one or more servers, workstations, databases, and other machines connected together and maintained by a manager of connected data, including but not limited to map, sensor, wireless network, temporal climate and incident data. The term location cloud 121 is used herein to collectively include the ingestion, analytic / computational, interface API's and message distribution capabilities residing in both local and cloud based systems including the systems used for creating, maintaining, accessing, and updating one or more database(s) 123. As depicted in FIG. 6, the location cloud 121 (or traffic management system) includes a processor 600, a communications interface 605, a plurality of data sources 615, a plurality of filters 620, and one or more sinks 630. The location cloud 121 may be configured to provide up to date information and maps to external map databases or mapping applications. The location cloud 121 collects or ingests data from multiple sources, such as through the network 127, in order to maintain up to date roadway conditions. Data such as device data, sensor data, weather, road conditions, traffic flow, and historical data is processed to determine current and future traffic conditions. The location cloud 121 may generate and provide map updates, such as real time traffic updates, turn by turn directions, public transportation routes and information about local business and attractions.

The location cloud 121 may be the means for generating up to date map data from collected data. The location cloud 121 may be the means for managing versions of map data between data sources 615, filters 620, and sinks 630. The location cloud 121 may receive information relating to one or more devices 122 over the network 127. The location cloud 121 may be configured to store and generate map data from the received information.

The location cloud includes a plurality of filters 620, a plurality of map data sources 615, and a plurality of sinks 630. The plurality of filters 620 may include filters that operate on map data. The plurality of sources 615 may include map data sources stored in the location cloud and map data sources external to the location cloud.

Figure 7:
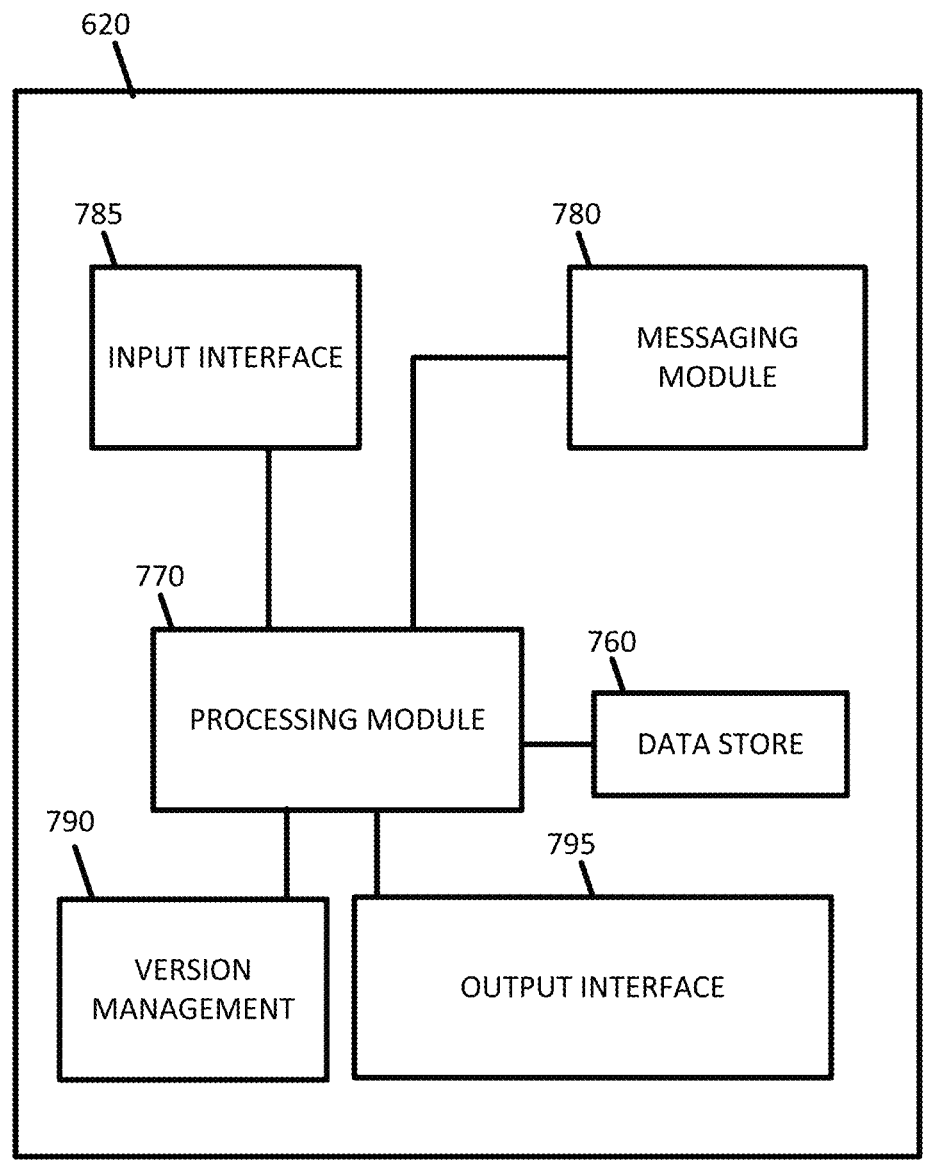
FIG. 7 depicts an example filter of FIG. 6.

An example filter 620 of the system of FIG. 6 is depicted in FIG. 7. The filter 620 includes a data store 760 that is configured to store one or more versions of map data, a processing module 770 configured to process one or more versions of maps data, a messaging module 780 configured to transmit notifications, and a version management module 790 configured to store meta data including one or more rules that define valid versions of the map data for the processing module. The filter 620 further includes an input interface 785 and an output interface 795 that may be configured as APIs.

The processing module 770 may be the means to receive map data from a different filter, data source, or external input, alter the map data and generate a set of map data. The processing module 770 may be configured to generate notification messages and transmit the messages through the messaging module 780. The processing module 770 may also be configured to access the data store 760 to determine compatibility of map data. The processing module 770 may include a general processor, digital signal processor, an application specific integrated circuit (ASIC), field programmable gate array (FPGA), analog circuit, digital circuit, combinations thereof, or other now known or later developed processor. The processing module 770 may be a single device or combinations of devices, such as associated with a network, distributed processing, or cloud computing.

The messaging module 780 may include any operable connection. An operable connection may be one in which signals, physical communications, and/or logical communications may be sent and/or received. An operable connection may include a physical interface, an electrical interface, and/or a data interface. The messaging module 780 may provide for wireless and/or wired communications in any now known or later developed format. The messaging module 780 may include a receiver/transmitter for digital radio signals or other broadcast mediums.

The version management module 790 may be configured to store one or more rules that define which versions of map data are compatible with one another and the filtering processing. The versions management module 790 may be the means for determining compatibility between versions of data from one or more data sources 615.

The input and output interfaces 785, 795 may be configured to receive and transmit map data and meta data from the filter to and from sources, sinks, or other interfaces. The input and output interfaces 785, 795 may provide APIs for access to the map data stored in the data store 760.

The data store 760 may be configured to store one or more versions of map data. The data store 760 may store one or more versions of map data received from a source or filter, or may store one or more versions of map data generated by the processing module 770. The data store 760 may also be configured to store meta data relating to the versions of map data, including but not limited to version ID, a complete version vector history, and changes from previous versions. The data store 760 may be a volatile memory or a non-volatile memory. The data store 710 may include one or more of a read only memory (ROM), random access memory (RAM), a flash memory, an electronic erasable program read only memory (EEPROM), or other type of memory.

The plurality of map data sources 615 may include one or more data stores that include data received from devices 122 or external sources. The data sources 615 may be collections of data that is received from one or more devices 122. The device 122 may be a mobile device or a sensor that provides samples of data for the location of the device 122 or a vehicle. The device 122 may be mobile phones running specialized applications that collect location data as the devices 122 traverse a roadway network. The device(s) 122 may also be integrated in or with a vehicle. Applications, computer sub-systems or sensors that are either standard or optional equipment on a vehicle may collect and aggregate information regarding the operation of the vehicle. The device(s) 122 may also be a sensor or a collection of sensors, such as an inductance loop or optical detector (e.g., camera, light detection and ranging (LiDAR), or radar device). The device(s) 122 may be a camera/imaging sensor for gathering image data (e.g., the camera sensors may automatically capture traffic flow information, abnormal incidents, and/or roadway information. The device(s) may be sensors located on the perimeter of the vehicle in order to detect the relative distance of the vehicle from lane or roadways, the presence of other vehicles, pedestrians, traffic lights, potholes and any other objects, or a combination thereof. The device 122 may operate from a fixed position and may be permanently deployed or a portable device that is located temporarily in the vicinity of a traffic incident, road construction, or a special event.

The device(s) 122 and/or other sensor(s) may be the means for collecting data from one or more vehicles. The data may be transmitted over the network. The device(s) 122 may also be configured to receive data through the network. The received data may include routing or navigation data, video data, audio data, or data relating to the device 122 or vehicle. Additional equipment may be included in the system. For example, in certain embodiments, the system may include environmental sensors, connected traffic signals, dynamic message signs, closed circuit televisions cameras and video image processing systems, grade crossing warning systems, and ramp metering systems. Lane management systems and barrier systems that control access to transportation infrastructure such as roadways, bridges and tunnels may also be included. Work zone systems including work zone surveillance, traffic control, driver warning, and work crew safety systems may also be included. The equipment may be connected to the network in order to collect and provide information relating to the roadway network. Each data source 615 may include a database that stores and updates the data received from the devices 122 or other sources.

The plurality of sinks 630 may include APIs to allow for users or applications to access the map data. A sink 630 may store a map database (also referred to as a dynamic content database, sensor ingestion database, traffic database, or geographic database) and may include geographic data used for traffic or navigation related applications. The location cloud 121 may also provide navigation related features and functions to the end user using the map data stored in the plurality of sinks 630 or geographic databases. The geographic database 123 includes information about one or more geographic regions including attributes and data relating to one or more nodes, one or more road segments, and one or more points of interest.

Figure 8:
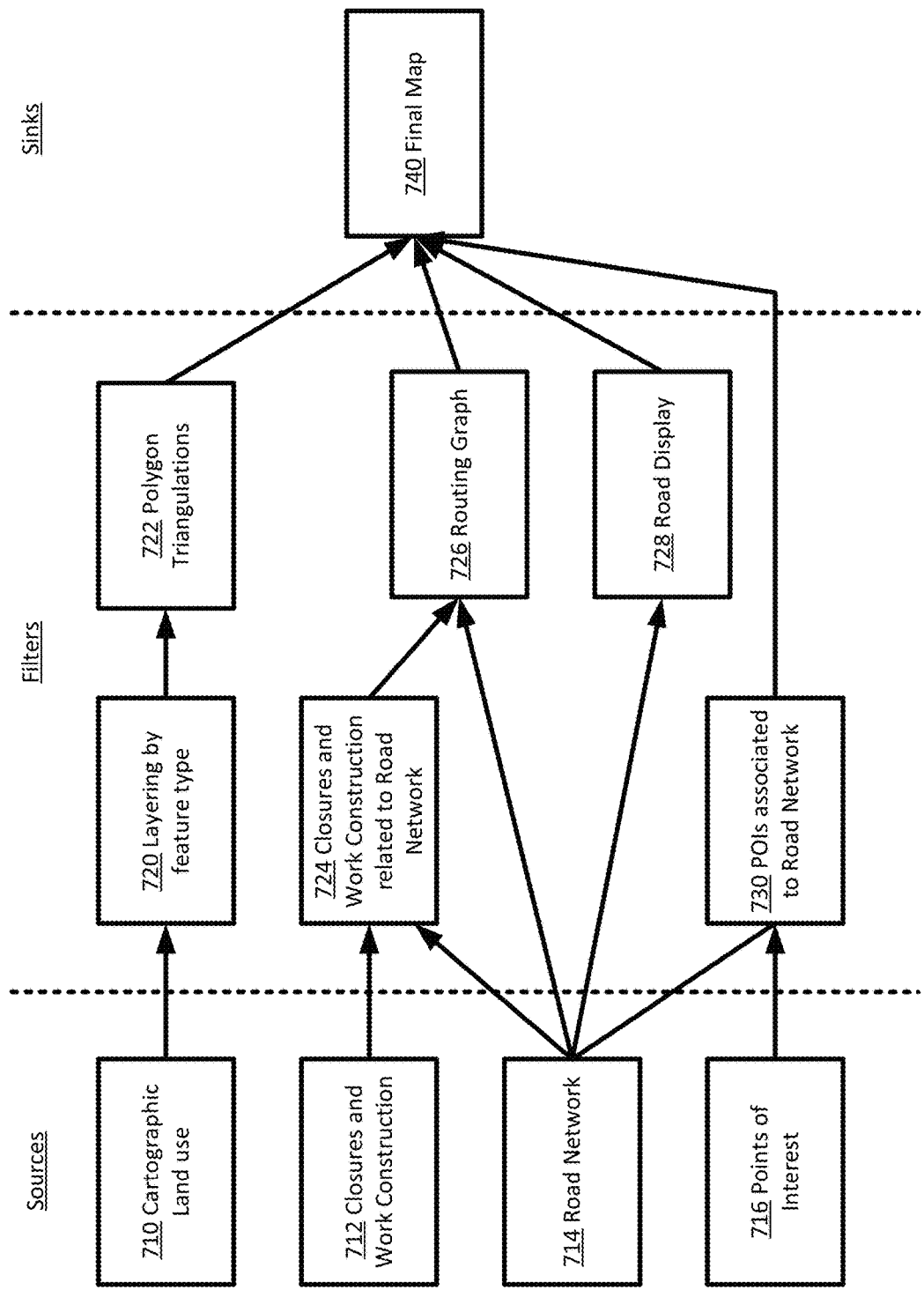
FIG. 8 illustrates an example workflow for providing map data using the system of FIG. 6.

FIG. 8 illustrates an example workflow for providing map data using the system of FIG. 6. FIG. 8 includes four data sources, six filters, and one sink. The four data sources include Source 710—cartographic land use, Source 712—closures and work constructions, Source 714—road network, Source 716—points of interest (POI). The six filters include Filter 720—layering by feature type and importance, Filter 722—polygon triangulation, Filter 724—closures and work constructions associated to roads, Filter 726—routing graph, Filter 728—road display, and Filter 730—POIs associated to roads. The one sink includes Sink 740—Final map. The final map may be stored as a geographic database, e.g. a map store in a sink in the location cloud. Users or applications may access the final map and map data stored within using an API in the sink 740.

Each filter in the example workflow includes a versioning table that defines the version compatibility of the respective filter. The Filter 724, for example, uses inputs from source 712 and source 714. Filter 724 may include a versioning table that states that source data is compatible from the two sources if the version of data from 712 is equal to or greater than the version from 714. The Filter 724 would operate on closures and work construction data with a data version of V:5 and road network map data with a version of V:3 but would not be compatible with a closure and work construction data version of V:6 and a road network map data of V:8. The output of Filter 724 may include both the global version ID and the versions of source 712 and 714 that were input into filter 724.

Figure 9:
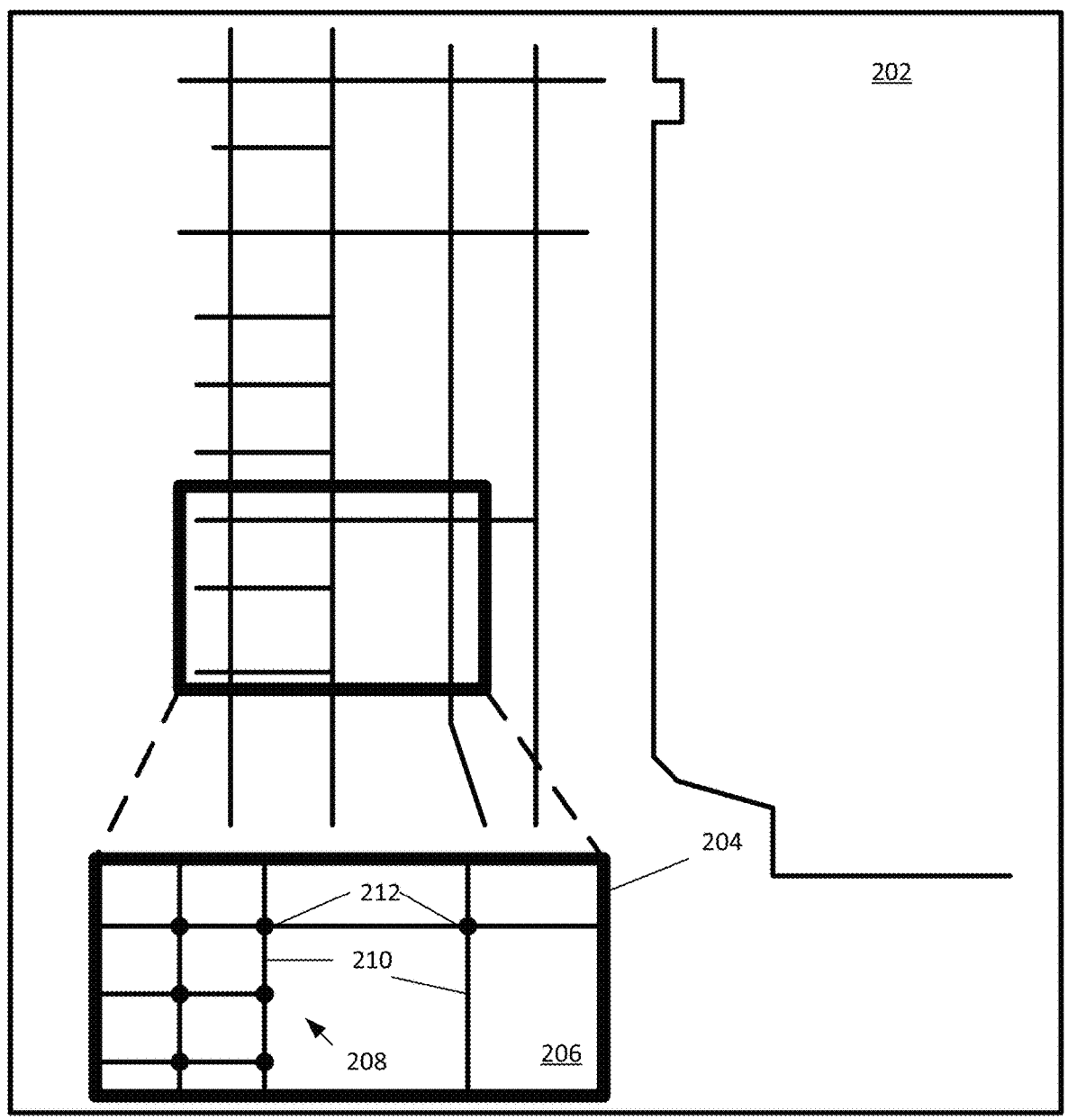
FIG. 9 illustrates an example map of a geographic region.

The final map stored in the sink 740 may include a geographic database 123 that is configured to store a map and map attributes for a geographic region. FIG. 9 illustrates an example map of a geographic region 202. The geographic region 202 may correspond to a metropolitan or rural area, a state, a country, or combinations thereof, or any other area. Located in the geographic region 202 are physical geographic features, such as roads, points of interest (including businesses, municipal facilities, etc.), lakes, rivers, railroads, municipalities, etc.

FIG. 9 further depicts an enlarged map 204 of a portion 206 of the geographic region 202. The enlarged map 204 illustrates part of a road network 208 in the geographic region 202. The road network 208 includes, among other things, roads and intersections located in the geographic region 202. As shown in the portion 206, each road in the geographic region 202 is composed of one or more road segments 210. A road segment 210 represents a portion of the road. Each road segment 210 is shown to have associated with the road segment 210, two nodes 212; one node represents the point at one end of the road segment and the other node represents the point at the other end of the road segment. The node 212 at either end of a road segment 210 may correspond to a location at which the road meets another road, i.e., an intersection, or where the road dead-ends.

Figure 10:
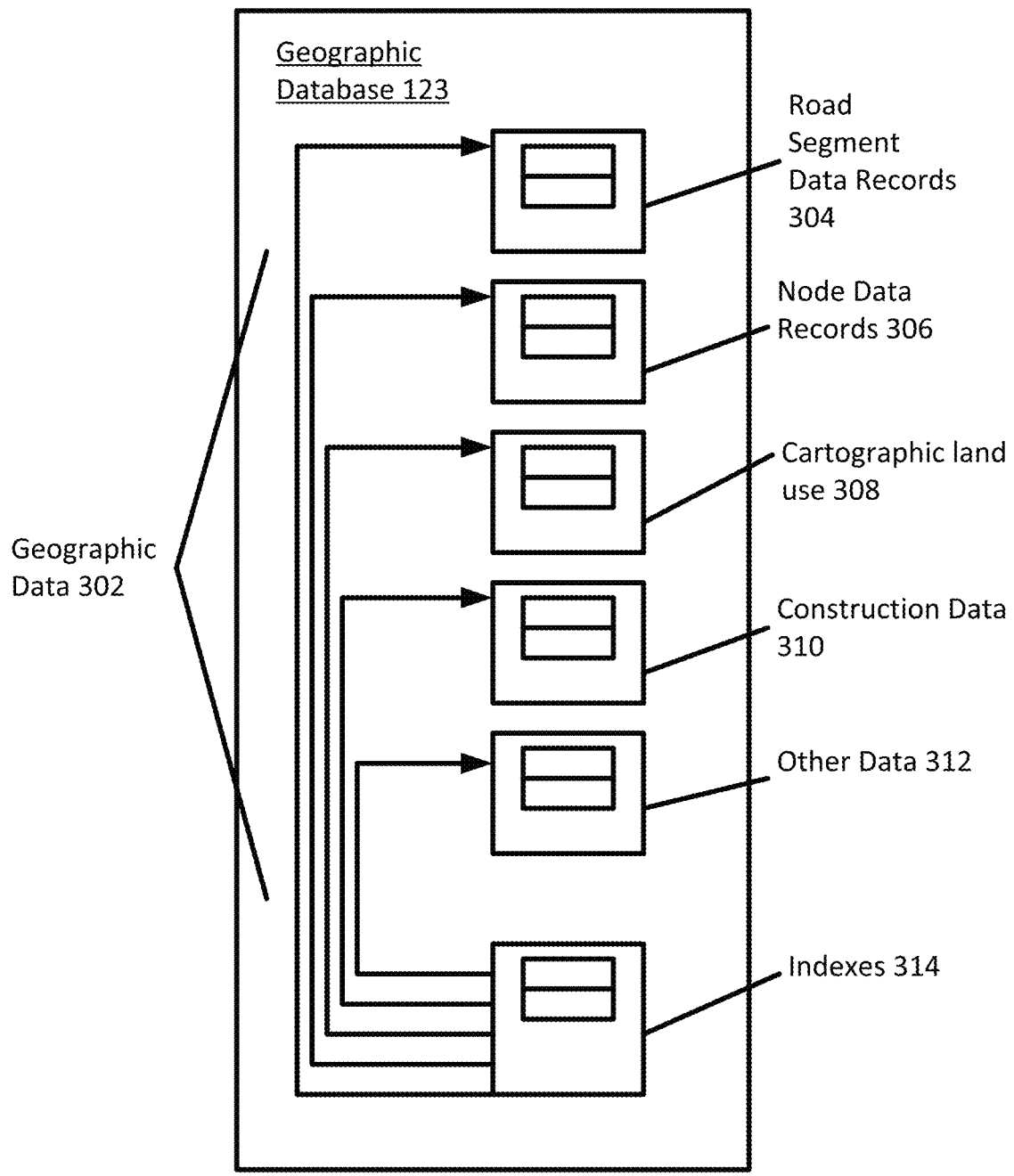
FIG. 10 depicts an example geographic database.

FIG. 10 depicts an example geographic database 123 of the workflow of FIG. 8. The geographic database 123 contains data 302 that represents some of the physical geographic that were added by the filters of FIG. 8. The geographic database 123 may contain additional data. The data 302 contained in the geographic database 123 may include data that represent the road network 208. The geographic database 123 that represents the geographic region 202 may contain at least one road segment database record 304 (also referred to as "entity" or "entry") for each road segment 210 in the geographic region 202. The geographic database 123 that represents the geographic region 202 may also include a node database record 306 (or "entity" or "entry") for each node 212 in the geographic region 202. The terms "nodes" and "segments" represent only one terminology for describing the physical geographic features, and other terminology for describing the features is intended to be encompassed within the scope of the concepts.

The geographic database 123 may also include other kinds of data 312 that has been added by one or more filters. The other kinds of data 312 may represent other kinds of geographic features or anything else. The other kinds of data may include point of interest data (from source 716 or filter 730). For example, the point of interest data may include point of interest records including a type (e.g., the type of point of interest, such as restaurant, hotel, city hall, police station, historical marker, ATM, golf course, etc.), location of the point of interest, a phone number, hours of operation, etc. The geographic database 123 may contain cartographic land use data or closure and construction data.

The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304. The indexes may include cartographic land use 308 or construction data 310. As another example, the indexes 314 may relate point of interest data in the other data records 312 with a road segment in the segment data records 304.

The geographic database 123 may store information or settings for display preferences. The geographic database 123 may be coupled to a display. The display may be configured to display the roadway network and data entities using different colors or schemes. The geographic database 123 may store and display information relating to where conditions or malfunctions may exist or have existed, for example, through analysis of the current and historical traffic conditions.

The geographic database 123 and the data stored within the geographic database 123 may be licensed or made available through sinks in the system. Other navigational services or network operators may access the map data stored in the geographic database 123 by interfacing with an API included in one or more of the filters or sinks.

Figure 11:
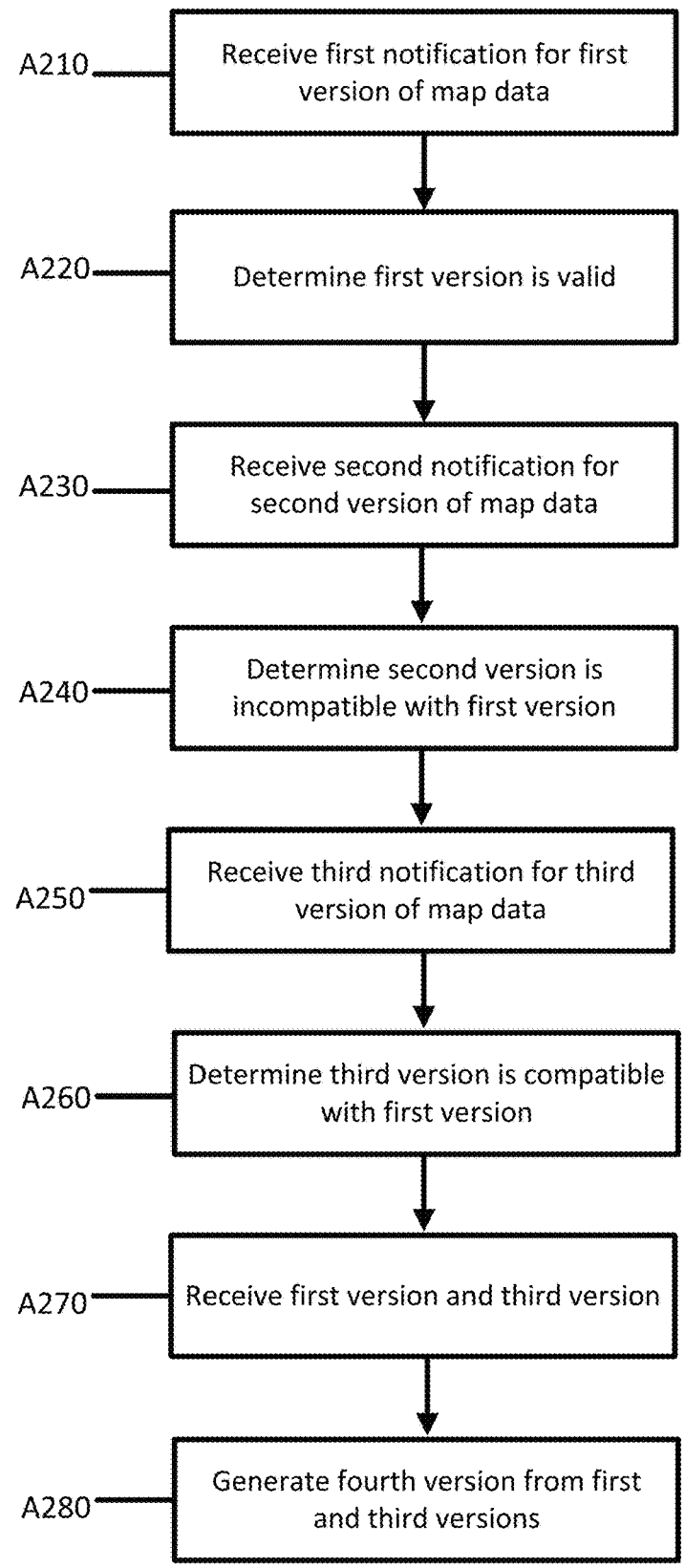
FIG. 11 illustrates an example workflow for providing map data.

FIG. 11 illustrates a workflow for a filter of the system of FIG. 6. As presented in the following sections, the acts may be performed using any combination of the components indicated in FIG. 1, 5, or 7. Additional, different, or fewer acts may be provided. The acts are performed in the order shown or other orders. The acts may also be repeated.

At act A210, the filter 620 receives a first notification that a first version of first map data from a first source is available. When map data is updated, changed, or processed, a notification may be generated. The data source or filter may transmit the notification to all data elements in the system or to just those data elements that are subscribed. The notification may include a version ID and other meta data that describes the updated map data.

At act A220, the filter 620 determines that the first version of first map data as compatible with the filter. The filter 620 may include a set of version rules that define compatibility between the filter and one or more versions of map data. The version rules may be as simple as requiring that the version IDs of the map data be the same. The version rules may be more complex, for example, defining a range of versions in relation to other versions that are compatible with the filter and other versions.

At act A230, the filter 620 receives a second notification that a second version of second map data from a second source is available, the second map data including different map data features than the first map data.

At act A240, the filter 620 determines that second version of second map data as incompatible with the first version of data. The filter 620 may determine that the second version of map data is out of date (or too new). At act A250, the filter 620 receives a third notification that a third version of second map data from the second source is available, the third version newer than the second version.

At act A260, the filter 620 determines that the third version of second map data is compatible with the first version of map data.

At act A270, the filter 620 requests and receives the first version of first map data and third version of second map data. In certain embodiments, the filter 620 may receive the versions of map data along with the notifications. The filter 620 may also receive or identify additional data that may be used below in act A280.

At act A280, the filter 620 generates a fourth version of third map data using the first version and third version. After generation, in certain embodiments, the filter 620 may generate a notification that is then published to the system. The notification may include meta data that identifies the fourth version of third map data.

In certain embodiments, an autonomous vehicle may request and receive map data from a sink or a filter in the system. As described herein, an autonomous driving vehicle may refer to a self-driving or driverless mode that no passengers are required to be on board to operate the vehicle. An autonomous driving vehicle may be referred to as a robot vehicle or an autonomous driving vehicle. The autonomous driving vehicle may include passengers, but no driver is necessary. Autonomous driving vehicles may park themselves or move cargo between locations without a human operator. Autonomous driving vehicles may include multiple modes and transition between the modes.

As described herein, a highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode that the human operator exercises a degree of control over the movement of the vehicle. The vehicles may also include a completely driverless mode. Other levels of automation are possible.

The autonomous or highly automated driving vehicle may include sensors for identifying the surrounding environment and location of the car. The sensors may include GNSS, light detection and ranging (LIDAR), radar, and cameras for computer vision. Proximity sensors may aid in parking the vehicle. The proximity sensors may detect the curb or adjacent vehicles. The autonomous or highly automated driving vehicle may optically track and follow lane markings or guide markings on the road.

Autonomous or highly automated driving vehicle may require high definition up to date maps. Providing for consistent and quick updates to map data not only assists in identifying hazards (or potentially unexpected stopped traffic), but also may help with routing decisions (e.g. avoiding highly congested areas). The location cloud 121 may communicate with the highly-automated driving vehicle directly or may provide APIs for the autonomous vehicle to access for up to date data.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Navigation Satellite System (GNSS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The memory may be a non-transitory medium such as a ROM, RAM, flash memory, etc. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The following embodiments are disclosed.

Embodiment 1: A method for executing a filter on map data. The method comprises receiving, by the filter, a first notification that a version of first map data from a first map data source is available; determining, by the filter, the version of first map data is compatible using one or more version rules stored in the filter; processing, by the filter, the version of first map data, when the version of first map data is compatible; and generating, by the filter, a second notification that a processed version of first map data is available.

Embodiment 2: the method of claim 1, further comprising transmitting, by the filter, the second notification to one or more filters that are dependent on the filter.

Embodiment 3: the method of claim 2, further comprising: receiving, by the filter, a request for the processed version of first map data from the one or more filters that are dependent on the filter.

Embodiment 4: the method of claim 1, further comprising: providing, by the filter, an application program interface configured to allow access to the processed version of first map data.

Embodiment 5: the method of claim 1, further comprising: providing, by the filter, an application program interface configured to allow access to meta data for the processed version of first map data.

Embodiment 6: the method of claim 1, wherein the version table includes one or more rules that define valid versions of first map data for the filter.

Embodiment 7: the method of claim 6, wherein the one or more rules include one or more compatibility rules for a plurality of versions of map data.

Embodiment 8: the method of claim 1, wherein the second notification includes a full version dependency chain of the processed version of first map data.

Embodiment 9: the method of claim 1, further comprising: receiving, by the filter, a third notification that a version of second map data from a second map data source is available; and validating, by the filter, that the second version of map data is compatible with the first version of map data using the version rules stored in the filter.

Embodiment 10: the method of claim 1, wherein the first map data source contains map data relating to traffic conditions.

Embodiment 11: the method of claim 1, wherein first map data source contains map data relating to a roadway network.

Embodiment 12: a filter for processing map data, the filter comprising: a processing module configured to process one or more versions of map data; a data store configured to store the one or more versions of map data and meta data related to the one or more versions of map data; a messaging module configured to receive and transmit one or more notifications relating to the one or more versions of map data stored in the data store; and a version management module configured to store one or more rules that define a plurality of compatible versions of map data for the processing module.

Embodiment 13: the filter of claim 12, further comprising: a data application program interface configured to facilitate access to the one or more versions of map data stored in the data store.

Embodiment 14: the filter of claim 12, further comprising: a meta data application program interface configured to facilitate queries of the meta data stored in the data store.

Embodiment 15: the filter of claim 12, wherein the version management module is further configured to store data identifying one or more changes between the one or more versions of map data stored in the data store.

Embodiment 16: the filter of claim 12, wherein the version management module is configured to store a set of rules that define a plurality of compatible relationships between the compatible versions of map data.

Embodiment 17: the filter of claim 12, wherein the plurality of compatible relationships includes a range of versions of map data compatible with a different version of map data.

Embodiment 18: a method for executing filters on map data, the method comprising: receiving, by a filter, a first notification that a first version of first map data from a first source is available; determining, by the filter, that the first version of first map data is compatible with the filter; receiving, by the filter, a second notification that a second version of second map data from a second source is available, the second map data including different map data features than the first map data; determining, by the filter, that the second version of second map data is incompatible with the first version of map data; receiving, by the filter, a third notification that a third version of second map data from the second source is available, the third version newer than the second version; determining, by the filter, that the third version of second map data is compatible with the first version of map data; receiving, by the filter, the first version of first map data and the third version of second map data; and generating, by the filter a fourth version of third map data using the first version and the third version.

Embodiment 19: the method of claim 18, further comprising: generating a fourth notification that the fourth version of third map data is available.

Embodiment 20: the method of claim 19, further comprising: transmitting the fourth notification to one or more subscribed filters.

Embodiment 21: an apparatus, configured to perform and/or control the method of any of embodiments 1-11 or comprising means for performing and/or controlling any of embodiments 1-11.

Embodiment 22: an apparatus, comprising at least one processor and at least one memory including computer program code for one or more programs, the at least one memory and the computer program code configured to, with the at least one processor, to perform and/or control the method of any of embodiments 1-11.

Embodiment 23: a computer program comprising instructions operable to cause a processor to perform and/or control the method of any of embodiments 1-11, when the computer program is executed on the processor.

We claim:

1. A method for executing a plurality of separate filters to allow injection of new filters into a system without disturbing existing filters, wherein a newly implemented filter is configured to check for notifications or publish notifications without having explicitly hardwired connections to other filters or sources wherein each of the plurality of separate filters are configured to be tested or altered without stopping the system, the method comprising:
  receiving, by a first filter of the plurality of separate filters, a first notification that a first version of map data from a map data source is available;
  determining, by the first filter, that the first version of map data is compatible with the first filter using one or more version rules stored in the first filter;
  processing, by the first filter, the first version of map data into a second version of map data by performing a first operation on the first version of map data;
  generating, by the first filter, a second notification that the second version of map data is available;
  transmitting, by the first filter, the second notification to one or more filters of the plurality of separate filters that are dependent on the first filter, the one or more filters configured to further process at least the second version of map data;
  receiving, by a second filter of the one or more filters, the second notification;
  determining, by the second filter, that the second version of map data is compatible with the second filter using one or more version rules stored in the second filter;
  processing, by the second filter, the second version of map data into a third version of map data by performing a second operation on the second version of map data, the second operation distinct from the first operation;
  generating, by the second filter, a third notification that the third version of map data is available; and
  transmitting, by the second filter, the third notification to one or more additional filters of the plurality of separate filters that are dependent on the second filter, the one or more additional filters configured to further process the third version of map data and provide an interface for an application to access and use the third version of map data.

2. The method of claim 1, further comprising:
  receiving, by the first filter, a request for the second version of map data from the one or more filters that are dependent on the first filter.

3. The method of claim 1, further comprising:
  providing, by the first filter, an application program interface configured to allow access to the second version of map data.

4. The method of claim 1, further comprising:
  providing, by the first filter, an application program interface configured to allow access to meta data for the second version of map data.

5. The method of claim 1, wherein the first filter includes a versioning table includes one or more rules that define valid versions of map data for the first filter.

6. The method of claim 5, wherein the one or more rules include one or more compatibility rules for a plurality of versions of map data.

7. The method of claim 1, wherein the second notification and the third notification include a full version dependency chain of the map data.

8. The method of claim 1, wherein the map data source contains map data relating to traffic conditions.

9. The method of claim 1, wherein the map data source contains map data relating to a roadway network.

10. A system for processing map data, the system comprising:
  a plurality of separate filters configured to process and communicate map data between one another as a function of a current version of map data, the plurality of separate filters configured to allow injection of new filters into the system without disturbing existing filters, wherein a newly implemented filter is configured to check for notifications or publish notifications without having explicitly hardwired connections to other filters or sources, wherein each of the plurality of separate filters is configured to be tested or altered without stopping the system, each of the plurality of separate filters comprising at least:
    a processing module configured to process one or more versions of map data received from different sources;
    a data store configured to store the one or more versions of map data and meta data related to the one or more versions of map data;
    a messaging module configured to receive and transmit, from and to other filters of the plurality of filters, one or more notifications relating to the one or more versions of map data stored in the data store; and
    a version management module configured to store one or more rules that define a plurality of compatible versions of map data for the processing module.

11. The system of claim 10, each of the plurality of filters further comprising:
  a data application program interface configured to facilitate access to the one or more versions of map data stored in the data store.

12. The system of claim 10, each of the plurality of filters further comprising:
  a meta data application program interface configured to facilitate queries of the meta data stored in the data store.

13. The system of claim 10, wherein the version management module is further configured to store data identifying one or more changes between the one or more versions of map data stored in the data store.

14. The system of claim 10, wherein the version management module is configured to store a set of rules that define a plurality of compatible relationships between the compatible versions of map data.

15. The system of claim 14, wherein the plurality of compatible relationships includes a range of versions of map data compatible with a different version of map data.

16. A method for executing a plurality of filters to allow injection of new filters into a system without disturbing existing filters, wherein a newly implemented filter is configured to check for notifications or publish notifications without having explicitly hardwired connections to other filters or sources, wherein each of the plurality of separate filters are configured to be tested or altered without stopping the system, allowing map data to be able to flow from sources to end users or applications without pausing the system, the method comprising:
  receiving, by a first filter, a first notification that a first version of map data from a first source is available;
  determining, by the first filter, that the first version of map data is compatible with the first filter;
  receiving, by the first filter, a second notification that a second version of map data from a second source is available, the second version including different map data features than the first version;
  determining, by the first filter, that the second version is incompatible with the first version;
  receiving, by the first filter, a third notification that a third version of map data from the second source is available, the third version newer than the second version;
  determining, by the first filter, that the third version is compatible with the first version;

receiving, by the first filter, the first version and the third version;

generating, by the first filter a fourth version of map data using the first version and the third version;

generating, by the first filter, a fourth notification that the fourth version is available;

transmitting, by the first filter, the fourth notification to one or more filters that are dependent on the first filter, the one or more filters configured to further process the fourth version;

receiving, by a second filter of the one or more filters, the fourth notification;

determining, by the second filter, that the fourth version is compatible with the second filter using one or more version rules stored in the second filter;

processing, by the second filter, the fourth version into a fifth version of map data;

generating, by the second filter, a fifth notification that the fifth version is available; and transmitting, by the second filter, the fifth notification to one or more additional filters that are dependent on the second filter, the one or more additional filters configured to further process the fifth version.

\* \* \* \* \*